C. L. BRIGGS.
MACHINE FOR CUTTING HAND HOLES.
APPLICATION FILED NOV. 27, 1911.
1,023,619.
Patented Apr. 16, 1912.
3 SHEETS—SHEET 1.
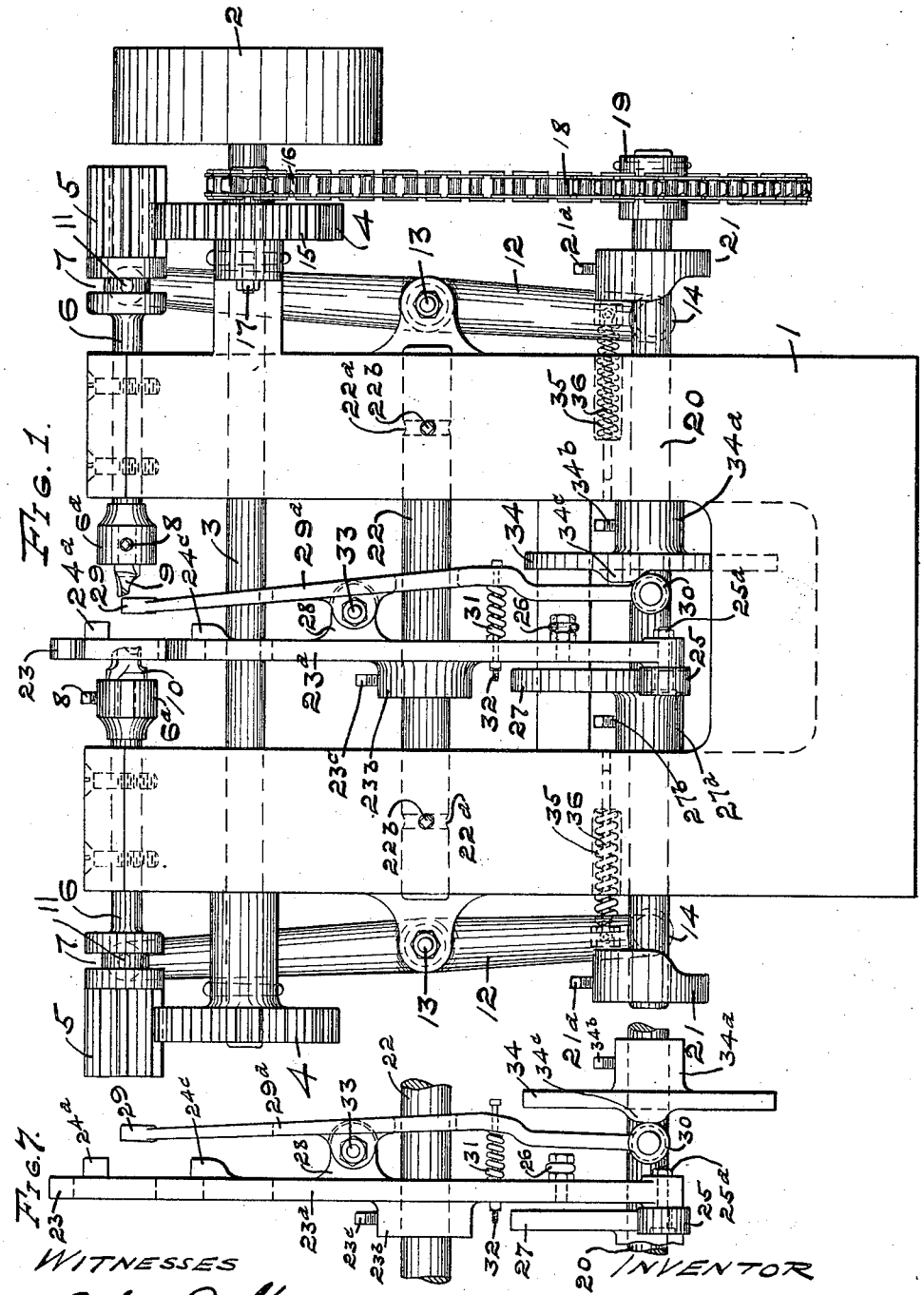

C. L. BRIGGS.
MACHINE FOR CUTTING HAND HOLES.
APPLICATION FILED NOV. 27, 1911.
1,023,619.
Patented Apr. 16, 1912.
3 SHEETS—SHEET 2.
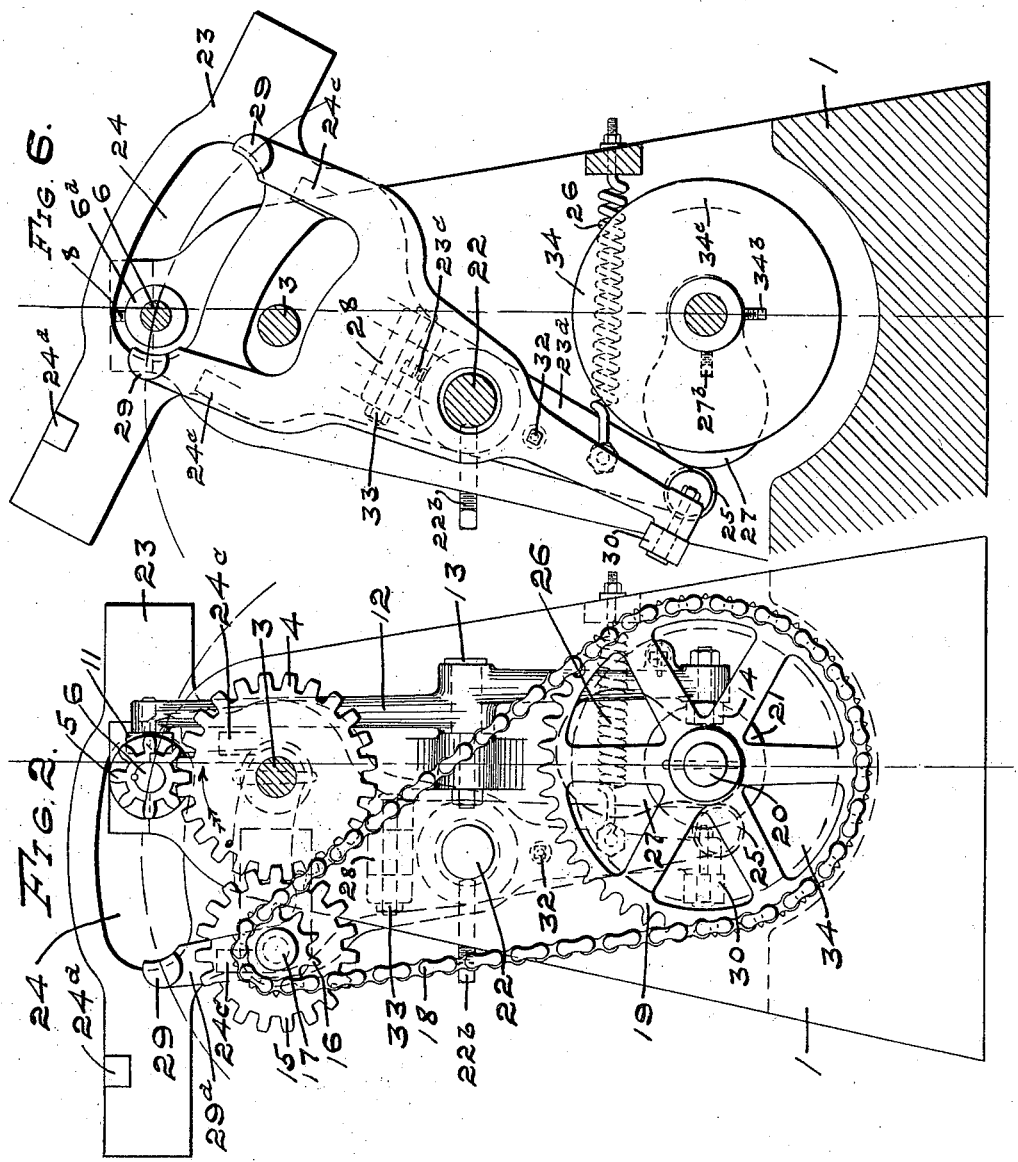
WITNESSES
Arthur P. Storer
Timothy F. O'Brien
INVENTOR
Charles L. Briggs
by H. B. Willson & Co.
Attorneys C. L. BRIGGS.
MACHINE FOR CUTTING HAND HOLES.
APPLICATION FILED NOV. 27, 1911.
1,023,619.
Patented Apr. 16, 1912.
3 SHEETS—SHEET 3.
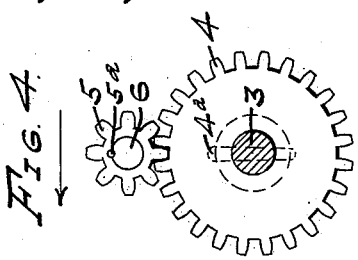
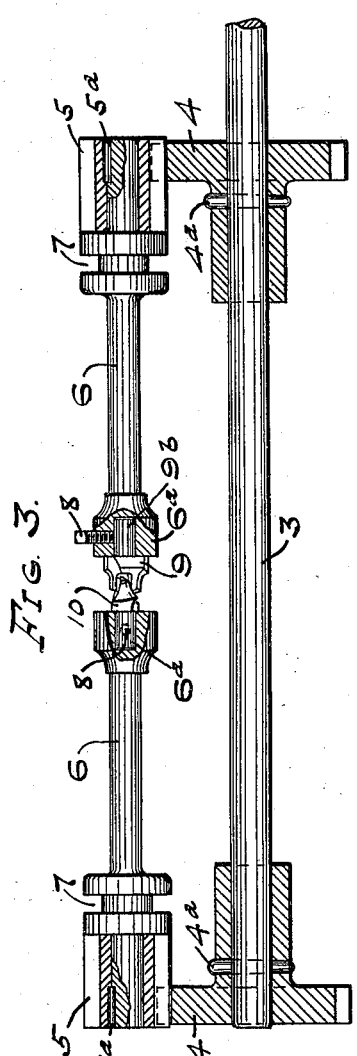
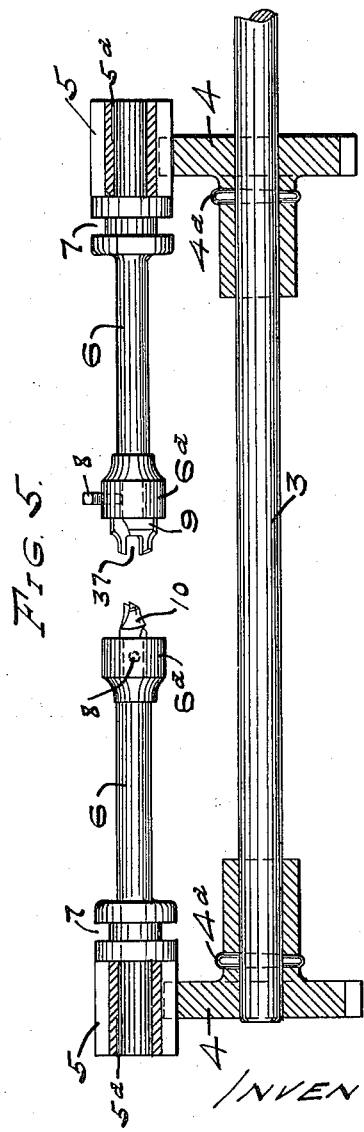

UNITED STATES PATENT OFFICE.

CHARLES L. BRIGGS, OF ATTLEBORO, MASSACHUSETTS.

MACHINE FOR CUTTING HAND-HOLES.

1,023,619.  Specification of Letters Patent.  Patented Apr. 16, 1912.

Application filed November 27, 1911. Serial No. 662,739.

*To all whom it may concern:*

Be it known that I, CHARLES L. BRIGGS, citizen of the United States, residing at Attleboro, in the county of Bristol and State of Massachusetts, have invented certain new and useful Improvements in Machines for Cutting Hand-Holes; and I do declare the following to be a full, clear, and exact description of the invention, such as will enable others skilled in the art to which it appertains to make and use the same.

This invention relates to woodworking and more especially to boring; and the object of the same is to produce a machine having multiple cutters which act simultaneously on opposite sides of a piece of wood to produce therein an oval or oblong hand hole. This object is carried out by the construction hereinafter more fully described and claimed, and as shown in the drawings wherein—

Figure 1 is a front elevation of this machine complete; Fig. 2 is an end elevation; Fig. 3 is an elevation of the power shaft and the cutting shafts, showing the cutter heads in section and the hollow auger and solid bit telescoping each other; Fig. 4 is an elevation taken from the right hand end of Fig. 3 with the power shaft in section;
Fig. 5 is an elevation similar to that shown in Fig. 3, with the cutter heads drawn apart; Fig. 6 is a perspective detail of the work holder, its supporting arm, and the mechanism for swinging the latter; Fig. 7 is a perspective detail of the gripper mechanism, its supporting arm and the cam by which it is moved.

Journaled in the frame 1 is a driving shaft 3 having a power wheel 2 receiving rotary motion by belt or otherwise, and said shaft carries two driving gears 4 pinned thereon as at 4ª each meshing with a long driven pinion 5 keyed as at 5ª on the outer end of a cutter shaft 6 also journaled in the frame 1. These shafts are in alinement with each other and have heads 6ª at their inner extremities in which, under set screws 8, are mounted the cutters for doing the boring. One of these numbered 9 is a hollow auger or a cutter head whose center is removed, and the other numbered 10 is a solid bit of a size to pass into the space at the center of the hollow auger 9. It follows that when these two heads are brought toward each other, their cutters will overlap the auger 9 boring a large ring into or hole through the stock and the bit 10 boring a small hole out of the center of the material worked upon by the auger, and yet as the two cutters telescope each other their cutting edges will not come in contact. In order to permit the cutters to approach each other and recede, the shafts 6 are mounted for both rotation and reciprocation within the frame 1, and each is provided with a groove 7 in which moves a pin 11 at the upper end of a lever 12 pivoted at 13 to the frame and having a roll 14 at its lower end; and when the lower ends of these levers are moved apart and toward each other, it will be clear that the cutter shafts will be reversely moved.

The mechanism which I prefer to employ for reciprocating the cutter shafts comprises a gear 15 mounted on a stub shaft 17 and driven from the power gear 4, a sprocket 16 fast to this shaft or the hub of the gear 15, a chain 18 leading from this sprocket to another numbered 19 mounted fast on a cam shaft 20 which is journaled to the frame, and two cams 21 mounted on this shaft by set screws 21ª and having their cam faces engaging said rolls 14 and properly timed as will be explained below.

The guide for the work consists of an upright plate 23 having through it a hole 24 of the shape of the hole to be bored in the stock, and at opposite ends stops 24ª and 24ᵇ between which the stock is inserted, and beneath the hole an additional stop 24ᶜ upon which the work rests; and this plate is supported by an arm 23ª having a hub 23ᵇ secured by a screw 23ᶜ on a rock shaft 22 whose extremities are journaled in the frame 1 and preferably grooved as at 22ª for the reception of set screws 22ᵇ so that the shaft may be adjusted or withdrawn. The mechanism which I preferably employ for moving this arm 23ª and the work-holding plate 23, consists of a cam 27 whose hub 27ª is mounted by a set screw 27ᵇ on the cam shaft 20, and a roll 25 mounted on a pin 25ª at the lower end of the arm 23ª which thus becomes a lever swinging on its pivot which is the shaft 22; and against the action of the cam face a spring 26 draws the lower end of this lever in one direction. The size of the cam 27 and the shape of its face will be such as to accomplish the work described below.

The gripper or holding device for the work consists of a jaw 29 standing opposite the plate 23 and mounted at the upper end of a gripper arm 29ᵃ which is pivoted as at 33 to a lug 28 on the arm 23ᵃ, its lower end being pressed away from said arm 23ᵃ by an expansive spring 31 mounted on a bolt 32, and the latter connecting the lower ends of the two arms so as to prevent their excessive separation by means of the spring; and on the lower end of said arm 29ᵃ is a roll 30 which moves against the face of a cam 34 whose hub 34ᵃ is secured by a set screw 34ᵇ on the cam shaft 20, the shape of this cam being such that its high point 34ᶜ will move the gripper arm and jaw at proper times to perform the work required of it as described below.

I consider an important feature of my invention to consist in the fact that the lower ends of the levers 12 are borne inward by the cams 21 so that the cutter heads are positively retracted; whereas said levers are moved in the opposite direction by expansive springs 35 mounted on bolts or rods 36 so that the cutters are pressed inward to their work with spring or yielding force. The result is that should the feed be too rapid, the material worked upon too hard, the cutters too soft or too dull, or should any accident occur the machine will not be broken because the cutters are fed to their work only by the springs 35 and these will not be stronger than necessary and will therefore yield when excessive strain is thrown upon the cutters.

The operation of this machine is as follows: When power is applied to the wheel 2 all parts of the machine are driven in a manner which will be clear. The stock to be operated upon is placed against the plate 23 between the various stops thereon at a time when the nose 34ᶜ of the cam 34 retracts the gripping jaw 29, and immediately the cam passes the roll 30 the jaw is moved toward the plate 23 and grips the stock against the work guide, after which the cam 34 revolves idly until it is time to take out the finished work and replace it by a new piece of stock. The face of the cam 27 acting on the roll 25 then causes a slow movement of the arm 23ᵃ around its center 22, and the work holding plate 23, with the jaw 29, is moved to and fro on an arc around the center of the shaft 22 as indicated in Fig. 2 by the dotted lines, which arc will follow the center of the hand hole being bored through the stock. It is to be understood that the face of the cam 34 is flat excepting for the radial projection indicated at 34ᶜ, and therefore the gripper jaw 29 will not be removed from the plate 23 nor the work released while the arm 23ᵃ is swinging as described. The various cams are of such shape and so timed that as soon as the work has been gripped the cams 21 acting on the rolls 14 commence to swing the levers 12, and the cutter shafts 6 are pushed longitudinally inward through their bearings within the main frame so that the heads 6ᵃ approach each other. The auger 9 bores a ring within one side of the stock, and simultaneously the bit 10 bores a hole in the other side thereof and at the center of the ring; and the result is that very soon the combined action of the two cutters will reduce the material to chips or sawdust which will be blown away by mechanism not illustrated herein as it forms no part of the present invention. Meanwhile the slow reciprocation of the plate 23 around its axis 22 moves the work with respect to the cutters so that the latter bore oval instead of round holes, and the result will be that the stock will be provided with an oval hand hole of a shape and size dependent upon the exact cams used. As soon as the hand hole has been finished, the low points in the cams 21 pass the rolls 14 and the high points thereof act on said rolls and compress the springs 35, whereby the lower ends of the levers 12 are borne inward and the pins 11 at the upper ends thereof traveling in the grooves 7 move the cutter shafts 6 outward and retract the cutters so as to withdraw them from the holes in the stock. Just at this time the nose or projection 34ᶜ of the cam 34 acts on the roll 30 to swing the gripper arm 29ᵃ and the gripper jaw 29 moves away from the finished stock which can be lifted off the stops on the work holder, and a new piece substituted therefor.

The relative sizes of parts will depend upon the nature of the work to be performed, and in addition to the various adjustments described, I reserve the right to make changes in details as come within the spirit of my invention. It is quite obvious that if the hand hole is not to be bored completely through the stock but in one face thereof, by removing one cutter and permitting the other to bore out the material only to a part of the thickness thereof, a hand-hold will be formed within the stock which is not a hole completely through it. Either the hole or the hold may be made wider and somewhat longer by substituting larger cutters, especially an auger 9 of greater circumference; and the length of the cut within the stock may be enlarged by substituting a cam 27 of different shape.

What is claimed as new is:

1. In a machine of the type described, the combination with cutter shafts standing in alinement and their inner ends spaced from each other, heads on said ends, a hollow auger in one head, a bit in the other of a size to pass into said auger, and mechanism for rotating said shafts and for moving them longitudinally inward and outward; of a work-holding plate having an oval hole surrounding one cutter and stops adjacent said hole, and a gripper jaw for pressing the work toward said plate and retracting it at intervals.

2. In a machine of the class described, the combination with a cutter-shaft and its tool; of a work holding plate having an oval hole surrounding the tool and stops adjacent said hole, a pivoted arm carrying said plate, a cam shaft having a cam acting on said arm, a gripper jaw opposite said plate, an arm carrying said jaw and pivoted to the work-holder arm, a spring for normally separating the lower ends of these arms, and a wide-faced cam on said shaft having at one point a radial projection for moving the gripper arm to temporarily release the gripper jaw from said plate.

3. In a machine of the class described, the combination with two alined cutter-shafts, a tubular cutter carried by one shaft and a solid bit by the other, and mechanism for rotating said shafts and for moving them inward and outward; of a work-holding plate having an oval hole surrounding one cutter and stops adjacent said hole, a pivoted arm carrying said plate, a cam shaft having a cam acting on said arm, a gripper jaw, and means for pressing the jaw toward said plate to grip the work and retracting it at intervals.

4. In a machine of the class described, the combination with two alined cutter-shafts, a tubular cutter carried by one shaft and a solid bit by the other, and mechanism for rotating said shafts and for moving them inward and outward; of a work-holding plate having an oval hole surrounding one cutter and stops adjacent said hole, a pivoted arm carrying said plate, a cam shaft having a cam acting on said arm, a gripper jaw opposite said plate, an arm carrying said jaw and pivoted to the work-holder arm, a spring for normally separating the lower ends of these arms, and a wide-faced cam on said shaft having at one point a radial projection for moving the gripper arm to temporarily release the gripper jaw from said plate.

In testimony whereof I have hereunto set my hand in presence of two subscribing witnesses.

CHARLES L. BRIGGS.

Witnesses:
 ANSON R. BELL,
 ARTHUR P. STORER.

---

Copies of this patent may be obtained for five cents each, by addressing the "Commissioner of Patents, Washington, D. C."